United States Patent
Pickard et al.

[11] 3,808,521
[45] Apr. 30, 1974

[54] DEVICE INCLUDING REFERENCE VOLTAGE AND COMPARATOR MEANS FOR MEASURING EARTH RESISTANCE

[75] Inventors: Keith Pickard, Otley; Arnold Aspinall, Bradford; David William, Dodsworth, Somerset, all of England

[73] Assignee: National Research Development Corporation, London, England

[22] Filed: Nov. 30, 1971

[21] Appl. No.: 203,187

[30] Foreign Application Priority Data
Dec. 9, 1970   Great Britain .................. 58555/70

[52] U.S. Cl. .................................................. 324/9
[51] Int. Cl. .............................................. G01v 3/06
[58] Field of Search ......................... 324/1, 4–6, 324/9, 98

[56] References Cited
UNITED STATES PATENTS

| | | | |
|---|---|---|---|
| 2,481,500 | 9/1949 | Crowl | 324/115 |
| 2,874,354 | 2/1959 | Bell | 324/115 X |
| 2,988,690 | 6/1961 | Love et al. | 324/64 X |
| 3,562,633 | 2/1971 | Swain | 324/9 X |
| 1,897,688 | 2/1933 | Ambronn | 324/1 |
| 2,046,436 | 7/1936 | Wascheck | 324/1 |
| 2,802,181 | 8/1957 | Gorski | 324/98 |
| 2,803,799 | 8/1957 | Siegel et al. | 324/98 X |
| 2,958,823 | 11/1960 | Rabier | 324/98 X |
| 3,254,297 | 5/1966 | McAlister et al. | 324/1 |
| 3,525,037 | 8/1970 | Madden et al. | 324/6 X |

FOREIGN PATENTS OR APPLICATIONS
834,120  2/1952  Germany ......................... 324/1

Primary Examiner—Gerard R. Strecker
Attorney, Agent, or Firm—Cushman, Darby & Cushman

[57] ABSTRACT

This invention concerns a device for measuring earth resistance. A constant alternating current is supplied from an inverter to a pair of spaced apart earth probes. Two further probes located between the earth probes are connected to the input stage of an amplifier having a very high input impedance so as to derive a signal which is proportional to the earths resistance. The output of the input amplifier is rectified and fed to a comparator which is also supplied a switched range of reference voltages.

1 Claim, 1 Drawing Figure

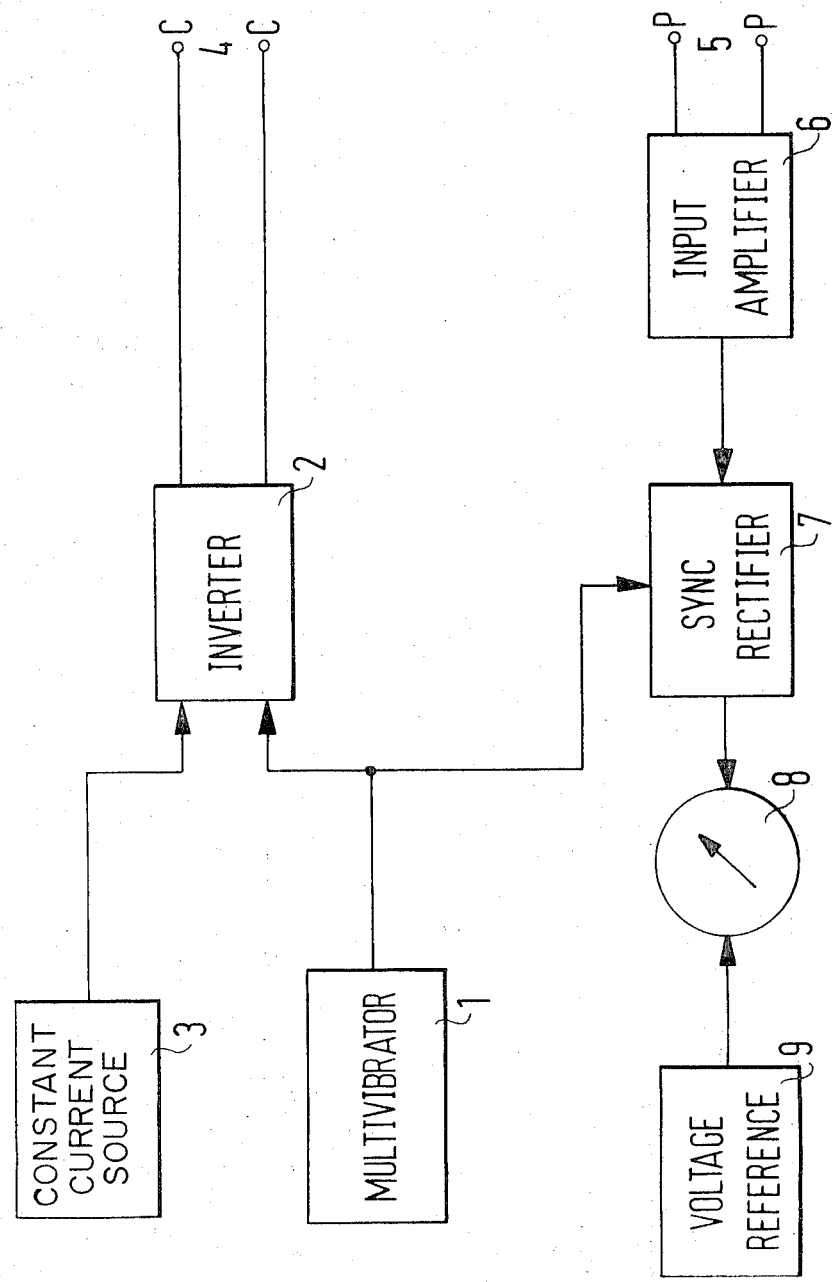

DEVICE INCLUDING REFERENCE VOLTAGE AND COMPARATOR MEANS FOR MEASURING EARTH RESISTANCE

The present invention concerns the measurement of earth resistance. For fifty years this technique has been extremely important in the field of geophysical survey. The electrical resistance of geological deposits is sufficiently variable for this parameter to be used to predict the presence of strata faults with considerable success.

The technique of electrical measurement of earth resistance has remained virtually unchanged for many years. Basically the potentiometric method is used; an alternating current between the current electrodes also flows through a variable calibrated potential divider. The voltage across the potential probes is compared with the variable potential difference and a balance is arranged. The potential divider is usually calibrated directly in ohms. The major disadvantage of such a method of measurement is the time required manually to achieve balance and then to read resistance. A further disadvantage is that accurate measurement of the voltage presents difficulties as the background earth resistance is always measured and the regions of interest are local variations on this background; these are sometimes only a few percent of the background in magnitude but may well rise to double its value. Continuous balancing of such variations either introduces considerable sophistication if an automatic servo-mechanism is used or wastes a large amount of time.

The present invention has for one object to overcome these disadvantages, and to provide an instrument which is simple to use, rapid to set up and extremely robust.

An embodiment of the present invention will now be described by way of example and with reference to the accompanying drawing which is a block diagram of a direct reading earth resistance meter constructed in accordance with the present invention.

The direct reading earth resistance meter shown in the drawing comprises a multivibrator 1, operating at a frequency of 125Hz, which is used to drive an inverter 2 to produce a 50 volt square wave. The source of current 3 to the inverter is held constant so that its output takes the form of an alternating constant current supplying a pair of spaced earth probes 4. The output is thus stabilised to give the fullest utilisation and a symmetrical current effect with respect to earth. The constant current source 3 acts to hold the root mean square current into the earth, which acts as the load, at a number set value ranging from 0 to 10 ma irrespective of variations of the load resistance over a wide range. The maximum value of load resistance which can be tolerated depends on the magnitude of the voltage generated by the inverter 2. Resistance to current flow due to the earth volume between the probes 4 is generally of the order of 100 ohms, and with the current supply described, the contact resistance between the probes 4 and ground must be at least 10 kilo ohms before flow is reduced.

The earth resistance is measured by two potential probes 5 connected to an amplifier 6 of the probes 5 being positioned between the earth probes 4. When the current supplied to the earth by the inverter 2 is constant, the voltage appearing across the probes 5 is proportional to the earth resistance which is to be measured. The effects of high probe-earth contact resistances on the measurement of the earth resistance are made negligible by the use of a boot-strapped stage in amplifier 6 having an input impedance of 10 M ohm. The output of the amplifier is rectified in a synchronous rectifier 7 driven by the multivibrator 1 referred to earlier and this rectified output is supplied to one input of a comparator in the form of a meter 8. The other input is supplied with a reference voltage from a stable, electronically controlled reference voltage supply 9. The voltage supply 9 is arranged so that it can be switched through a range of values such that equivalent resistances from 10 ohms to 1000 ohms in steps of 10 ohms are made available for comparison with the rectified signal from the synchronised rectifier 7.

The gain of the amplifier 6 is switched by conventional means (not shown) so that full-scale deflections corresponding to 10 ohms, 30 ohms, 100 ohms and 300 ohms may be presented on the output meter 8. The combination of switched reference voltage and gain controls provides great versatility in that output presentation; in the variations of 10 ohms above background values up to 100 ohms and 100 ohms above background values of 1000 ohms may be measured. In a typical case, resistance variations between 300 and 330 ohms would be examined using the reference voltage to permit such measurement with the meter's full-scale deflection corresponding to 30 ohms. This would be accomplished by setting the voltage supply 9 to oppose that voltage which the rectifier 7 would produce if 300 ohms were being measured. Thus, the actual measurement would equal 300 plus the meter reading.

Integrated circuitry is used extensively in the instrument described.

We claim:

1. An instrument for measuring earth resistance comprising a multivibrator, a source of constant current, an inverter connected to the outputs of the current source and the multivibrator for applying a constant alternating current to a first pair of earth probes, means including an input amplifier having variable gain control for deriving from a second pair of earth probes a signal proportional to the earth resistance between the second pair of earth probes, a synchronous rectifier connected to the output of the multivibrator and to the output of said amplifier, a switchable reference voltage source capable of providing a range of voltages, and a comparator having a first input connected to the output of said synchronous rectifier and a second input connected to the output of said reference voltage source, so that the output of the comparator represents the earth resistance to be measured.

* * * * *